United States Patent
Kaplan et al.

[11] Patent Number: 5,970,405
[45] Date of Patent: Oct. 19, 1999

[54] APPARATUS AND METHOD FOR PREVENTING FRAUDULENT CALLS IN A WIRELESS TELEPHONE SYSTEM USING DESTINATION AND FINGERPRINT ANALYSIS

[75] Inventors: Dmitry Kaplan, Bellevue; David M. Stanhope, Tacoma, both of Wash.; Randolph W. McKernan, Graton, Calif.; Howard L. Wilburn, Bainbridge Island; Evan R. Green, Bothell, both of Wash.

[73] Assignee: Cellular Technical Services Co., Inc., Seattle, Wash.

[21] Appl. No.: 08/810,318

[22] Filed: Feb. 28, 1997

[51] Int. Cl.⁶ .................................................. H04Q 7/20
[52] U.S. Cl. ..................... 455/410; 455/411; 455/67.1
[58] Field of Search ................................ 455/410, 411, 455/432, 435, 437, 456, 67.1, 67.7, 67.4

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,144,318 | 9/1992 | Kiahi | 342/357 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerohuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,375,244 | 12/1994 | McNair | 395/725 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/410 |
| 5,455,863 | 10/1995 | Brown et al. | 380/23 |

(List continued on next page.)

*Primary Examiner*—Edward F. Urban
*Assistant Examiner*—Tilahun Gesesse
*Attorney, Agent, or Firm*—Seed and Berry LLP

[57] ABSTRACT

A system and method for the detection of fraudulent use of a wireless telephone system includes a fingerprint analyzer that identifies an unauthenticated wireless telephone as authorized or fraudulent based on a fingerprint of the unauthenticated wireless telephone. The system maintains a valid destination list specific for each authorized wireless telephone. Each valid destination list contains destinations considered to be valid for that particular authorized wireless telephone. When an unauthenticated wireless telephone transmits a call request containing a destination, the system classifies the call as valid when the destination is in the valid destination list for the authorized wireless telephone regardless of whether the fingerprint analyzer identifies the unauthenticated wireless telephone as fraudulent. The system may bypass or terminate the fingerprint analysis, or simply ignore the result of the fingerprint analysis by the fingerprint analyzer. The system also maintains an invalid destination list specific for each authorized wireless telephone with destinations considered to be invalid for that particular authorized wireless telephone. Calls to such destinations are blocked. The system further maintains a suspicious destination list containing destinations considered to be potentially fraudulent. When the destination contained in the call request is in the suspicious destination list, the fingerprint analysis is performed with a higher threshold to require a closer match between a fingerprint of the unauthenticated wireless telephone and a stored fingerprint of the corresponding authorized wireless telephone.

63 Claims, 7 Drawing Sheets

U.S. PATENT DOCUMENTS

| | | | |
|---|---|---|---|
| 5,465,387 | 11/1995 | Mukherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 364/514 R |
| 5,555,551 | 9/1996 | Rudokas et al. | 455/410 |
| 5,557,654 | 9/1996 | Mäenpää | 379/58 |
| 5,615,408 | 3/1997 | Johnson et al. | 455/410 |
| 5,625,869 | 4/1997 | Nagamatsu et al. | 455/33.1 |
| 5,633,914 | 5/1997 | Rosa | 379/59 |
| 5,655,004 | 8/1997 | Holbrook | 455/411 |
| 5,713,072 | 1/1998 | Marth et al. | 455/33.1 |
| 5,715,518 | 2/1998 | Barrere et al. | 340/825.34 |
| 5,748,722 | 5/1998 | Lee | 379/160 |
| 5,748,742 | 5/1998 | Tisdale et al. | 380/49 |
| 5,758,277 | 5/1998 | Hawkes | 455/410 |
| 5,770,846 | 6/1998 | Mos et al. | 1235/440 |
| 5,777,558 | 7/1998 | Pennypacker et al. | 340/635 |
| 5,790,645 | 8/1998 | Fawcett et al. | 379/189 |
| 5,805,674 | 9/1998 | Anderson, Jr. | 379/93.03 |
| 5,870,672 | 4/1996 | Stoddard et al. | 455/67.1 |

APPARATUS AND METHOD FOR PREVENTING FRAUDULENT CALLS IN A WIRELESS TELEPHONE SYSTEM USING DESTINATION AND FINGERPRINT ANALYSIS

TECHNICAL FIELD

The present invention relates to wireless telephone systems, and in particular, to a system and method for detecting fraud in a cellular telephone system.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each cellular telephone. To place a phone call, the individual subscriber or other authorized user of a cellular telephone dials a telephone number and presses the "Send" button. In response, the cellular telephone transmits its ESN and MIN to the cellular system so the individual subscriber can be charged for the telephone call.

Unfortunately, unscrupulous individuals illegally operate cellular telephones by "cloning" the ESN and MIN of a valid subscriber's telephone in order to obtain illegal access to the cellular system without paying for the service. A pirate can obtain the ESN and MIN of a cellular telephone by monitoring a transmission of the cellular telephone, and then programming them into another telephone for illegal use. Thus, the mere transmission of the authentic ESN and MIN are inadequate to protect a cellular telephone system from illegal use by pirates.

In an effort to provide additional security, some cellular systems authenticate cellular telephones based on the transmission of data by the cellular telephone during a call set-up process. Rather than identify the cellular telephone by its ESN and MIN alone, the system identifies a cellular telephone by its transmission characteristics. In this manner, the cellular system can reject calls from cloned cellular telephones even when those cellular telephones transmit valid ESN and MIN numbers. For example, in U.S. Pat. No. 5,005,210 issued to Ferrell on Apr. 2, 1991 ("the Ferrell patent"), incorporated herein by reference, a system is described that analyzes certain transmitter characteristics in an effort to identify the transmitter type. The system in the Ferrell patent analyzes the manner in which the modulator makes a transition to the designated carrier frequency. This transient reference waveform is used to identify the type of transmitter. The transmission characteristics of the reference waveform can be processed in different manners to create a "fingerprint" of the individual transmitter.

While the Ferrell patent describes one class of transmission characteristics that can be used as a fingerprint, other fingerprint characteristics are also known in the art. For example, U.S. Pat. No. 5,420,910 to Rudokas on May 30, 1995 ("the Rudokas patent"), incorporated herein by reference, describes an identifier, such as a radio frequency signature, that can be used to positively identify a valid cellular telephone or a known fraudulent telephone. Other types of signature or fingerprint authentication systems are also known in the art.

Fingerprint authentication systems all require at least one transmission characteristic waveform, known to be generated by the authentic cellular telephone, to be used as a reference waveform for the fingerprint authentication system. Some systems may rely on more than one reference waveforms to generate the fingerprint. The term fingerprint as used herein is intended to include reference waveforms transmitted by a transmitter as well as the various transmission characteristics derived from those reference waveforms.

These fingerprint authentication systems require a substantial amount of data processing time to establish the fingerprint. However, this data processing is not time dependent and may be performed over a period of time. In contrast, the process of comparing the transmission characteristic of the unauthenticated transmitter with the stored fingerprint must be performed in real-time and quickly to effectively deny or terminate fraudulent calls. This can place difficult demands on a fingerprint authentication system's processing capabilities during peak calling periods. Some existing cellular telephone systems use non-fingerprint analysis techniques that are not real time. In those systems, if a call is subsequently determined to be fraudulent, the destination telephone number is added to a list of known fraudulent numbers. The cellular telephone system checks the list of known fraudulent numbers to prevent any subsequent telephone calls from being placed to a known fraudulent number.

Another drawback of these fingerprint authentication systems is that it is possible that a fraudulent cellular telephone will be misidentified as an authorized cellular telephone because no fingerprint analysis system is 100% effective. Conversely, it is possible that an authorized cellular telephone will be misidentified as fraudulent. While the former misidentification may result in incorrect charges to the customer, and the resulting loss of revenues to the service provider, the latter misidentification is of particular concern to service providers. Specifically, service providers do not wish to inconvenience the customer and disrupt valid calls due to the misidentification of an authorized cellular telephone as fraudulent or invalid.

Therefore, it can be appreciated that there is a significant need for a system and method for detecting fraudulent calls using characteristics other than a fingerprint waveform analysis thus preventing overloading of a cellular telephone fingerprint system's processing capabilities. There is also a significant need to reduce misidentification of valid calls as fraudulent by the fingerprint analysis method. The present invention provides these and other advantages as will be illustrated by the following description and accompanying figures.

SUMMARY OF THE INVENTION

The present invention is embodied in a system and method for preventing fraudulent calls in a wireless telephone network. The system includes a fingerprint analyzer that classifies an unauthenticated wireless telephone as authorized or fraudulent based on a transmission characteristic of the unauthenticated wireless telephone. In one aspect of the invention, the system maintains a locally valid list for each authorized wireless telephone. Each locally valid list contains at least one destination considered to be valid for the corresponding authorized wireless telephone. When an unauthenticated wireless telephone transmits a call request containing a destination, a processor in the system classifies the call as valid when the destination is in the locally valid list for the corresponding authorized wireless telephone regardless of whether the fingerprint analyzer identifies the unauthenticated wireless telephone as fraudulent. The system may bypass or terminate the fingerprint analysis, or simply ignore the result of the fingerprint analysis by the fingerprint analyzer.

In another aspect of the invention, the system maintains a suspicious destination list containing at least one destination considered to be called by fraudulent wireless telephones. When the destination contained in the call request is in the suspicious destination list, the fingerprint analysis is performed with a higher threshold to require a closer match between a fingerprint of the unauthenticated wireless telephone and a stored fingerprint of a corresponding authorized wireless telephone.

By providing destination analysis techniques in addition to the fingerprint analysis, the present invention provides the advantages of reducing false identification of calls by the fingerprint analyzer and reducing the computational load of the system.

In yet another aspect of the invention, a method of preventing fraudulent calls is provided using the above-identified lists. If the destination contained in the call request is in one of the lists, a corresponding threshold is set and used to perform the fingerprint analysis, and each threshold can be set based on a determined confidence value for the destination contained in the call request.

DETAILED DESCRIPTION OF THE INVENTION

For a more complete understanding of the present invention, the operation of a wireless cellular telephone system will be briefly discussed. Although the discussion that follows is directed to cellular telephones, it should be clearly understood that the invention can be used with any wireless telephone devices that may transmit voice such as cellular telephones or data such as data modems. Persons of ordinary skill in the art will also appreciate that the techniques described herein may be used in any type of wireless communications systems including wide-band and narrow-band personal communications services (PCS) systems. The term telephone as used herein is intended to include devices for wireless voice and data communication.

Figure 1:
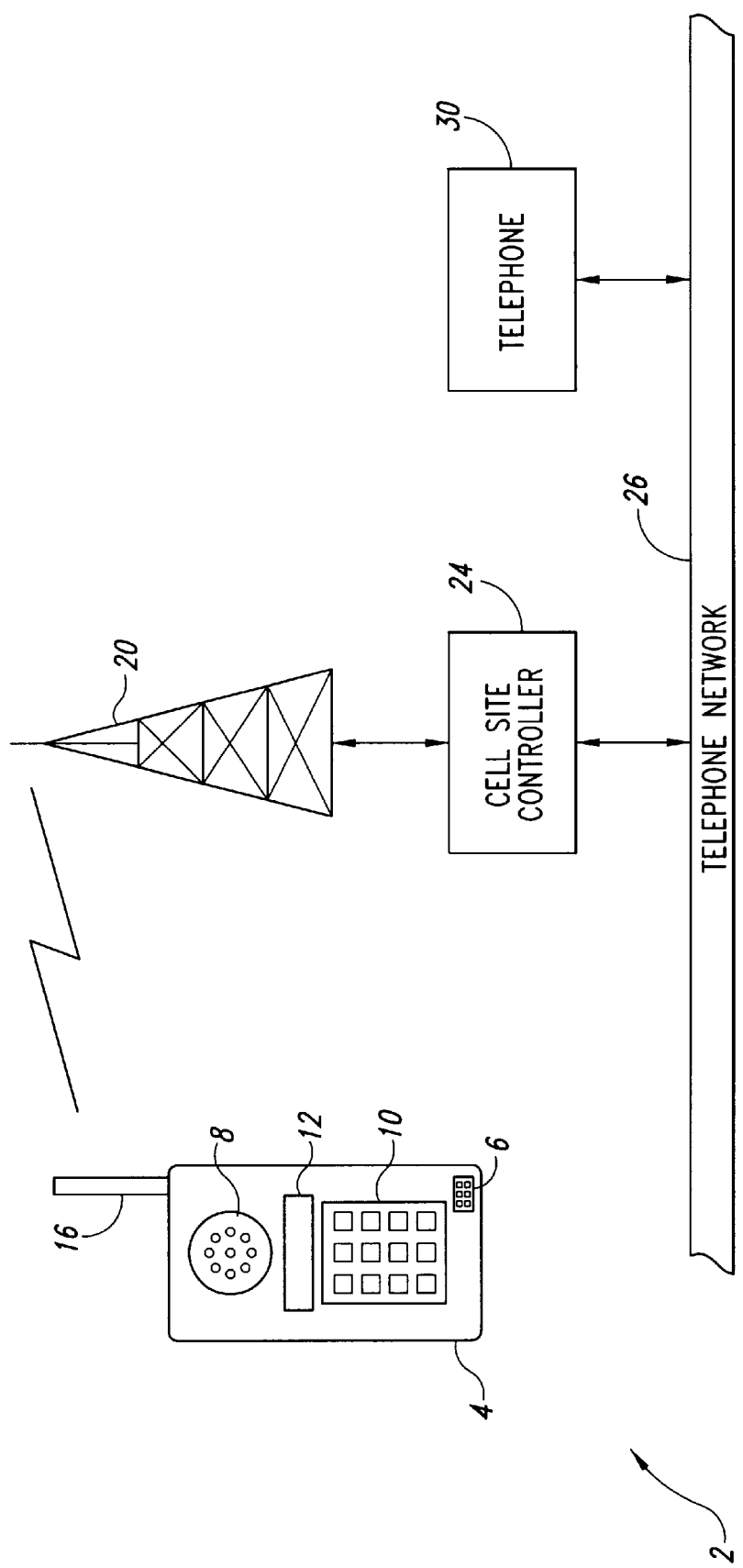
FIG. 1 illustrates the operation of a conventional cellular telephone system.

A conventional cellular telephone system 2 is illustrated in FIG. 1. An individual cellular telephone 4 has a microphone 6 and a speaker 8, as well as a keypad 10 and a display 12. Transmitter and receiver circuits (see FIG. 2) within the cellular telephone 4 communicate via a cellular telephone antenna 16 to a cell site antenna 20 at a frequency typically in the 800 megahertz (MHz) frequency range. The signal received by the cell site antenna 20 is connected to a cell site controller 24. The cell site controller 24 determines the authenticity of the ESN and MIN transmitted by the cellular telephone 4 at the beginning of a cellular telephone call, as well as a destination such as the telephone number contained in a call request transmitted by the cellular telephone 4. The cell site controller 24 connects the cellular telephone 4 to a conventional telephone network 26. Also connected to the telephone network 26 is a telephone 30 to which the cellular telephone 4 is placing a call. In this manner, the cellular telephone 4 can communicate with the telephone 30. Similarly, the telephone 30 may place a call to the cellular telephone 4 in the reverse manner described above. The telephone 30 is illustrated in FIG. 1 as connected directly to the telephone network 26. However, those skilled in the art will recognize that the telephone 30 could be another cellular telephone connected to the cell site controller 24 by the cell site antenna 20, or another cell site controller and antenna (not shown).

Figure 2:
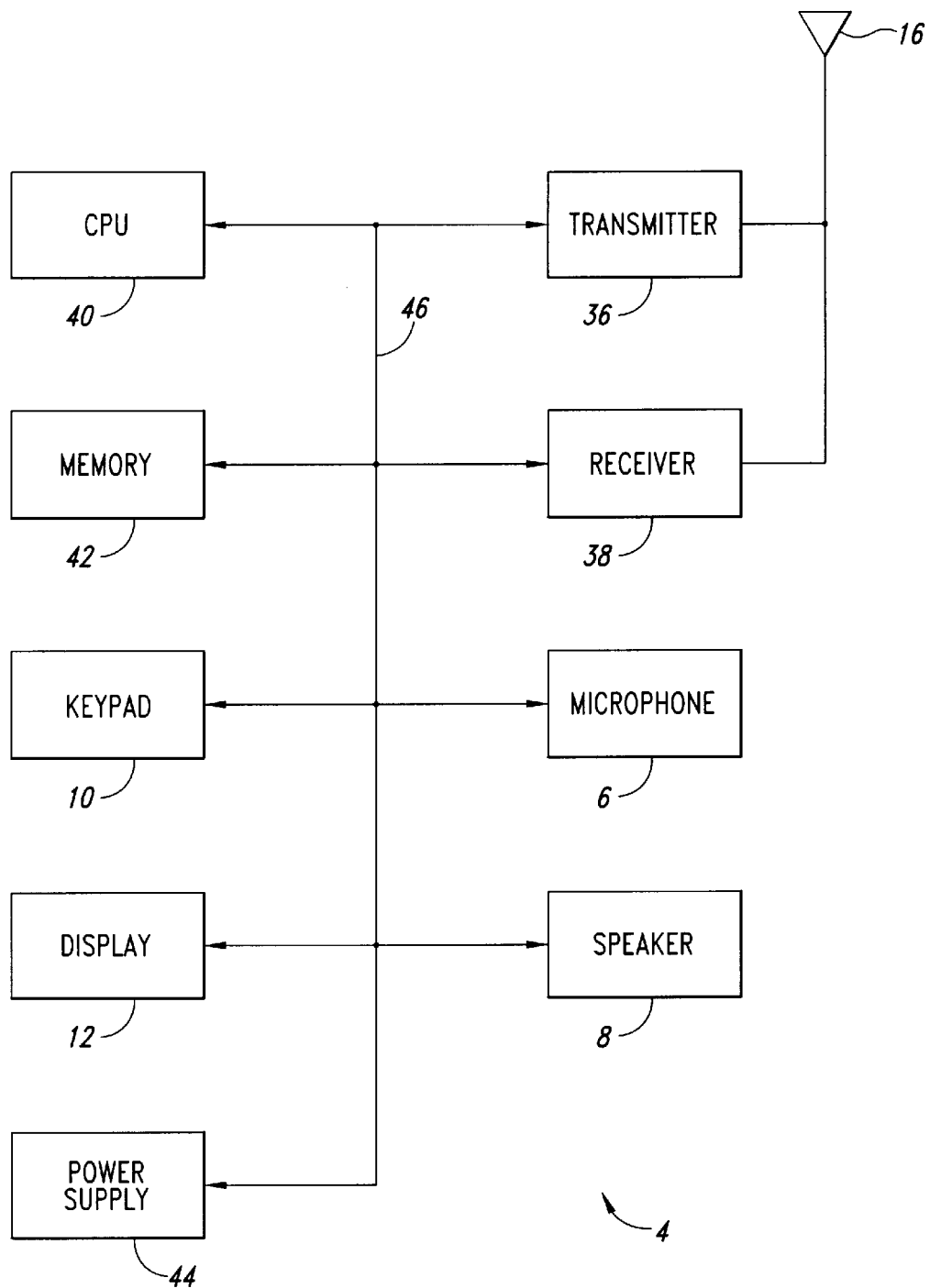
FIG. 2 is a functional block diagram of the conventional cellular telephone of FIG. 1.

The conventional cellular telephone 4 is illustrated in the functional block diagram of FIG. 2. The antenna 16 is connected to a transmitter 36 and a receiver 38. The microphone 6, speaker 8, keypad 10, and display 12 are conventional components that need not be described in any greater detail. The cellular telephone 4 also includes a central processing unit (CPU) 40, which may be an embedded controller, conventional microprocessor, or the like. In addition, the cellular telephone 4 includes a memory 42, which may include both random access memory (RAM) and read-only memory (ROM). The cellular telephone 4 also includes a power supply 44, which includes a battery (not shown) for internal power and a power supply connector (not shown). For the sake of clarity, other conventional components, such as the modulator, demodulator, and local oscillator have been omitted. The various components described above are connected together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cellular telephone 4 is well known in the art and thus will only be described in the context of the present invention.

The cellular telephone 4 communicates with the cell site controller 24 (see FIG. 1) using a control channel having a predetermined frequency for the cell site and a voice channel having a frequency designated by the cell site controller 24 for the particular call being placed. Initial communications between the cellular telephone 4 and the cell site controller 24 occur using only the control channel. The cellular telephone 4 transmits the stored ESN and MIN for the cellular telephone to the cell site controller 24 over the control channel. In addition, a call request containing a destination such as the dialed telephone number is also transmitted from the cellular telephone 4 to the cell site controller 24 over the control channel. Digital data using frequency-shift keying (FSK) of 10 KHz Manchester-encoded data is transmitted and received over the control channel.

Figure 3:
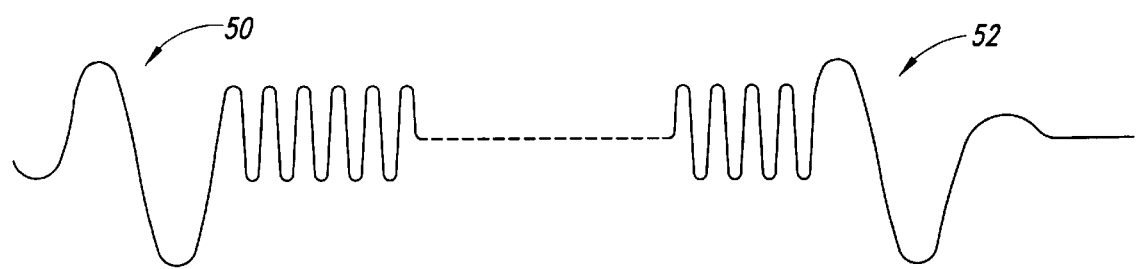
FIG. 3 is a waveform illustrating transmission characteristics of the transmitter of the cellular telephone of FIG. 2.

A typical waveform on the control channel is illustrated in FIG. 3. When the user first presses the "Send" button (not shown) on the keypad 10 (see FIG. 2), the transmitter 36 FSK modulates the data at the predetermined control frequency in the 800 MHz band. When the transmitter 36 is first activated, it locks onto the appropriate radio frequency (RF) for a particular control channel. The process of locking onto the selected control channel frequency generates a turn-on transient 50. It should be noted that the waveform illustrated in FIG. 3 is not the RF signal itself, but rather an example of the demodulated output received at the cell site controller 24. In addition to the turn-on transient 50, the cellular telephone 4 generates a turn-off transient 52. The turn-off transient 52 results from the turn-off transient response of the transmitter 36 when transmission on the control channel is complete. The turn-on transient 50 and the turn-off transient 52, which are described in the Ferrell patent, are presented herein merely as examples of the transmission characteristics of an individual cellular telephone transmitter 36. Alternatively, the cell site controller 24 can analyze other transmission characteristics such as the transient response of the FSK data. Other reference waveforms are illustrated in the Rudokas patent and other references. These reference waveforms, which can be from any source of reference waveforms, are used to generate a fingerprint for the cellular telephone 4. The fingerprint is subsequently used to determine if a cellular telephone making a call is the authorized cellular telephone 4, or a fraudulent cellular telephone illegally transmitting an authentic ESN and MIN of the cellular telephone 4 of a valid subscriber.

The transmission characteristics, no matter how derived, are received at the cell site controller 24, processed and compared with a stored fingerprint for the authorized cellular telephone 4. One such system for adaptively comparing waveforms is discussed in U.S. patent application Ser. No. 08/611,429, entitled "Adaptive Waveform Matching For Use In Transmitter Identification," filed on Mar. 6, 1996, which is incorporated herein by reference in its entirety. That system performs a real-time analysis of the transmission characteristic from the unauthenticated transmitter with the stored fingerprint. That system also provides the ability to update the fingerprint and is thus adaptive.

Figure 4:
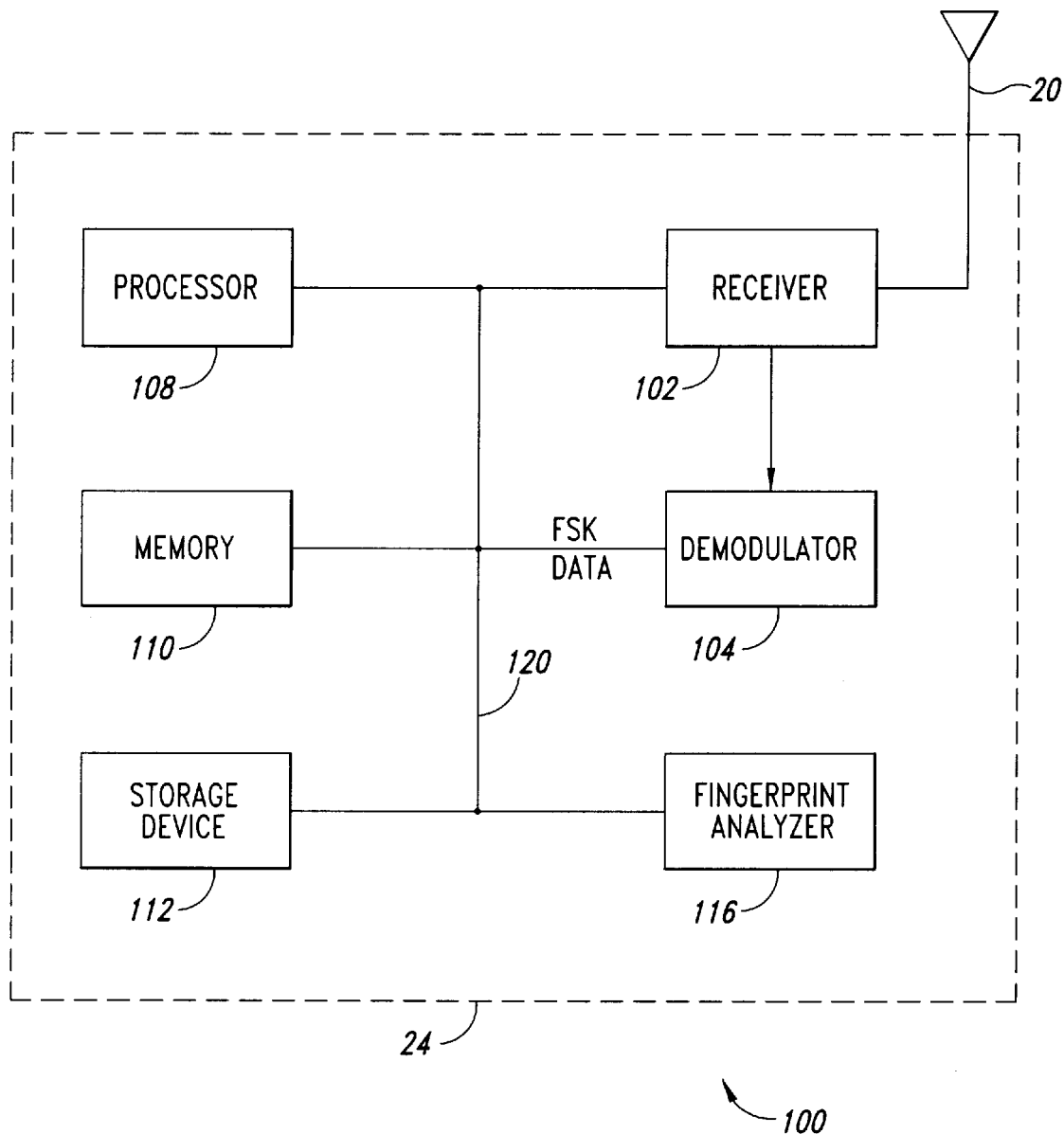
FIG. 4 is a functional block diagram of a fraud control system according to the present invention.

The present invention is embodied in a fraud control system 100 illustrated in the functional block diagram of FIG. 4, and is typically installed at and communicates with the cell site controller 24. In a preferred embodiment, a central computer system (not shown) connects together each fraud control system 100 located at each cell site through a high-speed data link (not shown) to control a group of cell sites. The system 100 includes a receiver 102 which is connected to the antenna 20. The signals received by the receiver 102 are connected to a demodulator 104 which demodulates the received RF signal and produces FSK data. A processor 108 processes the received FSK data. The processor 108 may be a central processing unit (CPU), micro-controller, conventional programmable processor, or the like. Many of the processes described herein are performed by the processor 108 using conventional programming techniques. The programming details are well known to those of ordinary skill in the art of computer programming and need not be described herein.

The system 100 also includes a memory storage device 110, which may include both random access memory (RAM) and read-only memory (ROM). An external storage device 112 is used to store data related to a plurality of calls from the cellular telephone 4 and calls to the cellular telephone. As will be explained in detail below, the storage device 112 also stores a plurality of destination data that are used in conjunction with fingerprint analysis. The storage device 112 may be part of the memory 110, or a mass storage unit such as a hard disk drive or the like.

The system 100 also includes a fingerprint analyzer 116 that performs a fingerprint analysis of a transmission characteristic of the transmitter 36 (see FIG. 2) in the cellular telephone 4. The fingerprint analyzer 116 may be a digital signal processor (DSP), a part of the processor 108, a separate processor, or the like. As discussed above, any acceptable fingerprint analysis technique will operate satisfactorily with the system 100. One example of a fingerprint analysis technique is described in the above-identified U.S. patent application Ser. No. 08/611,429, entitled "Adaptive Waveform Matching for Use in Transmitter Identification." However, the scope of the present invention is not limited by the specific technique used to perform the analysis of the transmission characteristics. Rather, the present invention is directed to a technique for the analysis of destination data contained in a call request from an unauthenticated cellular telephone independent of whether the fingerprint analyzer 116 determines that the unauthenticated cellular telephone is fraudulent.

The various components of the system 100 are connected together by a bus 120, which may carry control signals and power in addition to data. Other components of the cell site controller 24, such as a power supply, transmitter, telephone switching network, and the like are conventional components that form no part of the present invention. For the sake of brevity, those conventional components of the cell site controller 24 are omitted from the present description.

As previously stated, one disadvantage of the fingerprint analyzer 116 is that a valid telephone call from an authorized cellular telephone might be falsely rejected as a fraudulent call if based solely on the analysis by the fingerprint analyzer 116. Conversely, a call from a fraudulent cellular telephone might be falsely allowed as a valid call if based solely on the analysis by the fingerprint analyzer 116. However, the present invention is directed to additional analysis techniques that can classify a particular call as valid or invalid even though the fingerprint analyzer 116 may have determined, perhaps correctly or incorrectly, that the cellular telephone making the call is fraudulent. Thus, the present invention provides the advantage of reducing false identification of calls by the fingerprint analyzer 116.

Another disadvantage of the fingerprint analyzer 116 is that the fingerprint analysis between the fingerprint of an unauthenticated cellular telephone with a stored fingerprint must be performed in real-time and quickly to effectively deny or terminate fraudulent calls. This can place difficult demands on a fingerprint system's processing capabilities during peak calling periods. According to one embodiment of the present invention, however, the system 100 maintains various global destination lists that contain valid and invalid destinations for all users. The system 100 also maintains various local destination lists that contain valid and invalid destinations for each specific individual user with each local destination list being associated with a particular authorized cellular telephone. These global and local destination lists are used by the system 100 to classify a particular call as either valid or invalid regardless of whether the fingerprint analyzer identifies the unauthenticated cellular telephone as fraudulent. When the call is classified as either valid or invalid, the present invention may bypass or terminate analysis of the call by the fingerprint analyzer 116. Thus, the present invention in this embodiment provides the advantage of reducing the computational load of the system 100.

In another embodiment, the system 100 maintains a list of destinations that are considered to be potentially fraudulent by the cellular system operator. If a destination requested by the unauthenticated cellular telephone is in that list, the system 100 performs a fingerprint analysis through the fingerprint analyzer 116 with a higher threshold of certainty required, thus requiring a closer match than usual between the fingerprint of the unauthenticated cellular telephone and the stored fingerprint of a corresponding authorized cellular telephone to find the call to be valid. Thus, the present invention in this embodiment works in conjunction with the fingerprint analyzer 116 to provide a more accurate determination of the validity of a call to a suspicious destination by the unauthenticated cellular telephone.

In a preferred embodiment, the system 100 obtains and maintains in the storage device 112 the following five lists which are described in detail below: (1) globally valid list; (2) locally valid list; (3) globally invalid list; (4) locally invalid list; and (5) suspicious list. Each list is under the control of the cellular system operator and telephone numbers can be added and deleted to update each list either manually by the cellular system operator or automatically by the system 100. The phrase "list" is used herein in a broad sense to refer to any type of data or data set stored in the storage device 110 or 112 in any physical or logical manner which may be retrieved and processed by the processor 108.

The globally valid list stored in the storage device 112 contains destinations that are considered valid for all or at least a predetermined group of cellular telephones. Destinations such as 9-1-1 type emergency service numbers, and the cellular system operator's customer service and support lines are generally in this list and valid for all cellular telephones. A call request to a destination in the globally valid list is always allowed by the system 100 regardless of whether the fingerprint analyzer 116 identifies the cellular telephone making the call request as fraudulent.

The system 100 stores in the storage device 112 a locally valid list for each specific authorized cellular telephone. The locally valid list for a specific authorized cellular telephone is identified by the ESN and MIN for the authorized cellular telephone. Each list includes destinations frequently dialed by a user of the authorized cellular telephone and thus considered valid by the cellular system operator. Destinations such as the user's home telephone number, voice mail number, beeper number or the like are stored in this list. In one embodiment, the list may be obtained by having the user fill out a list of frequently called numbers at the point-of-sale location where a registration form subscribing to cellular service is signed. In another embodiment, the list may be obtained and updated dynamically from the user's monthly billing statements. A call request to a destination on the locally valid list is allowed by the cellular system operator regardless of whether the fingerprint analyzer 116 identifies the cellular telephone making the call request as fraudulent.

The globally invalid list stored in the storage device 112 contains destinations considered by the cellular system operator to be invalid for all cellular telephones. According to one method, destinations in the globally invalid list is updated by tracking the frequency of blocked calls to a particular destination and the number of unauthenticated cellular telephone placing calls to that particular destination. Destinations in this list are mostly illegal drug trade related telephone numbers, such as telephone numbers of known drug dealers, cocaine growers or the like. A call request to a destination in the globally invalid list is blocked by the cellular system operator regardless of whether the fingerprint analyzer 116 identifies the cellular telephone making the call request as valid or fraudulent. In addition to particular telephone numbers, the globally invalid list may also contain an office code, area code, or even a country code to block out all destinations in a selected area or country. For example, the cellular system operator may notice that too many fraudulent calls are being placed to Cuba and decide to add Cuba's country code in the globally invalid list to block out all destinations inside Cuba. The globally invalid list may also be time-of-day dependent and store a destination and a range of time in which a call request to that particular destination is invalid. For example, any international call to Cuba between the hours of 12 a.m. and 7 a.m. may be blocked. Thus, the destination of Cuba is considered to be in the globally invalid list between 12 a.m. and 7 a.m. and not in the list at any other time.

The system 100 stores in the storage device 112 a locally invalid list for each specific authorized cellular telephone. As with the locally valid list, the locally invalid list is identified by the ESN and MIN for the specific authorized cellular telephone to which it applies. Each list includes destinations that a user of the authorized cellular telephone has in the past complained about as being calls he did not make or the like, and hence are considered to be invalid for that user. For example, the user may call the cellular system operator and claim that certain calls in a billing statement received were not made by the user and should not be charged to the user. To maintain good customer relations, the cellular system operator typically gives credit for those disputed calls and adjusts the user's payment record. Based on this payment record, the cellular system operator may also add the disputed number to the locally invalid list for that user. A subsequent call request to a destination in the locally invalid list is blocked by the cellular system operator regardless of whether the fingerprint analyzer 116 identifies the cellular telephone making the call request as valid or fraudulent. As can be appreciated, maintaining the locally invalid lists has the added advantage of protecting the cellular system operator from repeated fraudulent claims by the users of authorized cellular telephones.

The locally valid and invalid lists may be added manually or automatically when a new MIN/ESN is assigned to an existing user either when that user requests a change of telephone number or buys an additional cellular telephone with a different telephone number. In either case, the fraud control system 100 transfers the destination data in the locally valid and invalid lists for that user to new valid and invalid lists with the new MIN/ESN.

The system 100 also stores in the storage device 112 a suspicious list containing those destinations that are considered by the cellular system operator to be potentially fraudulent for all cellular telephones. This list may include destinations that are known to be frequently called by cloned cellular telephones. If a call request is made to a destination in the suspicious list, the processor 108 executes a fingerprint analysis through the fingerprint analyzer 116 using a higher threshold of certainty than normal to require a closer match between the fingerprint of the unauthenticated cellular telephone and a stored fingerprint of a corresponding authorized cellular telephone for the call to be allowed.

Figure 5:
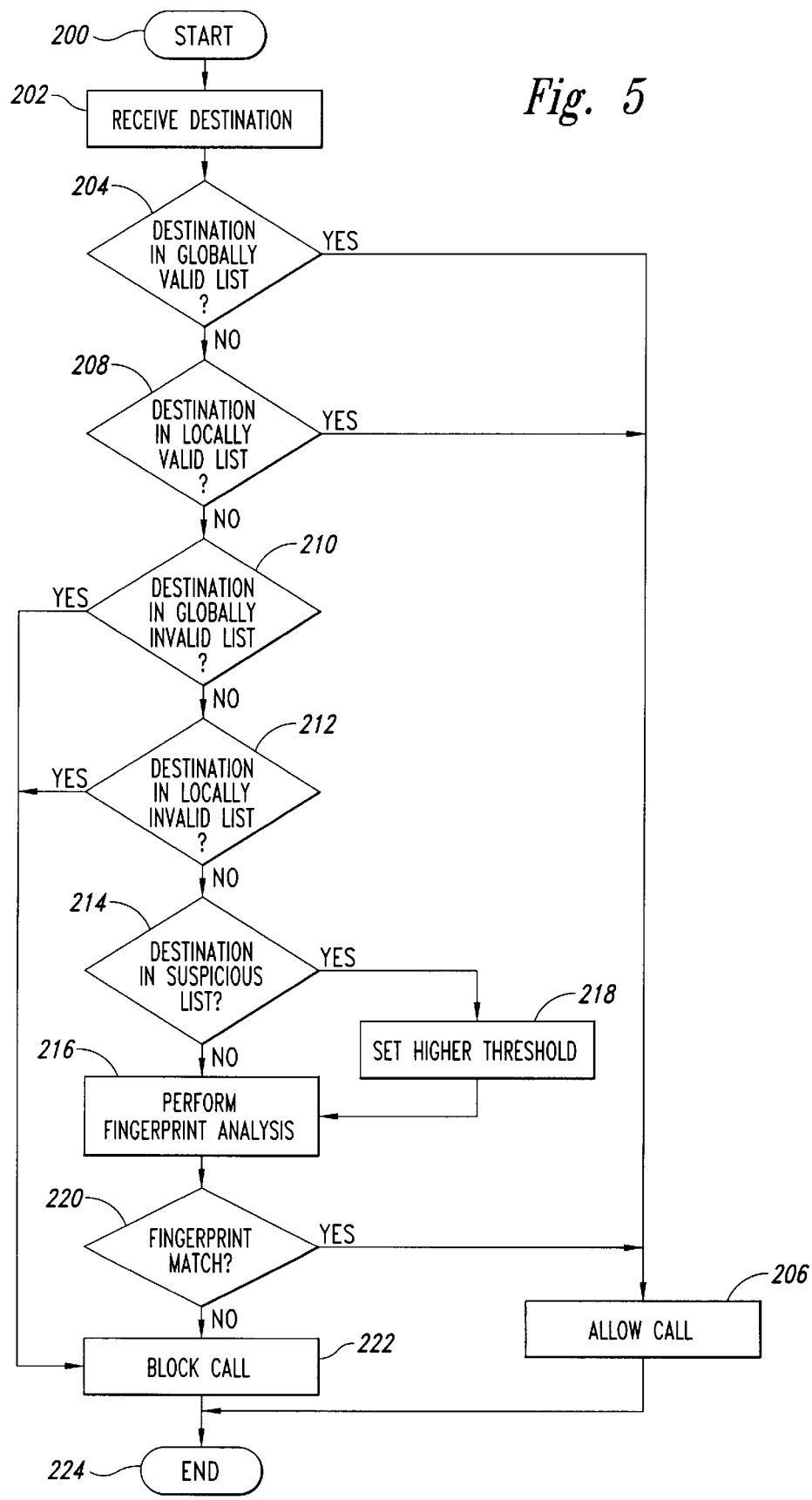
FIGS. 5 is a flowchart of the method of preventing fraudulent calls according to the present invention.

The operation of the system 100 is illustrated in a destination analysis flowchart of FIG. 5. At start 200, the cell site controller 24 is in communication with an unauthenticated cellular telephone which has initiated a call request containing a destination and its ESN/MIN. At step 202, the receiver 102 receives the destination and MIN/ESN data and the processor 108 stores the information in the memory 110. At decision 204, the processor 108 determines whether the destination is in the globally valid list stored in the storage device 112. If the result of decision 204 is "yes," the processor 108 allows the call in step 206 and ends the destination analysis in step 224. If the result of decision 204 is "no," the destination analysis continues with decision 208.

At decision 208, the processor 108 retrieves from the storage device 112 the locally valid list that corresponds to the ESN/MIN transmitted by the unauthenticated cellular telephone and places the list in the memory 110. Although not required, the locally valid lists are preferably indexed to allow the processor 108 to quickly locate the correct locally valid list. In one embodiment, the lists are indexed by the MIN. However, any other index such as ESN that can uniquely identify the cellular telephone may be used. Initially, the processor 108 uses the MIN of the unauthenticated cellular telephone contained in the call request and retrieves the locally valid list of the corresponding authorized cellular telephone having the same MIN from the storage device 112. Then the processor 108 determines whether the destination is in the retrieved locally valid list. If the result of decision 208 is "yes," the processor allows the call in step 206 and ends the destination analysis at step 224. If the result of decision 208 is "no," the destination analysis continues with decision 210. Alternatively at decision 208, the processor searches the corresponding locally valid list from the external storage device 112 without retrieving it into the memory 110.

At decision 210, the processor 108 determines whether the destination is in the globally invalid list stored in the storage device 112. If the result is "yes," the processor 108, in step 222, blocks the call requested by the unauthenticated cellular telephone and ends the destination analysis in step 224. There are many acceptable call blocking techniques that can be used with the system 100. One blocking technique is to transmit a hang-up message to the unauthenticated cellular telephone through the cell site controller 24 (FIG. 1). Another blocking technique is to inject an interfering signal on the voice channel assigned to the unauthenticated cellular telephone. Other examples of call blocking techniques are described in detail in U.S. patent application Ser. No. 08/521,797, entitled "Automated Forced Call Disruption For Use With Wireless Telephone Systems," filed on Aug. 31, 1995, which is incorporated herein by reference in its entirety.

If the result of decision 210 is "no," the destination analysis continues with decision 212. Similar to the steps taken for decision 208, the processor 108 uses the MIN of the unauthenticated cellular telephone contained in the call request and retrieves from the storage device 112 the locally invalid list that corresponds to the MIN of the authorized cellular telephone having the same MIN and places the list in the memory 110. Then the processor 108 determines whether the destination is in the retrieved locally invalid list. If the result of decision 212 is "yes," the processor 108 blocks the call in step 222 and ends the destination analysis in step 224. If, however, the result is "no," the destination analysis continues with decision 214.

At decision 214, the processor 108 determines whether the destination is in the suspicious list. If the result of decision 214 is "no," then the destination is in none of the destination lists maintained by the cellular system operator. In that case, the processor 108 executes step 216 and performs a fingerprint analysis through the fingerprint analyzer 116 with a predetermined threshold between a fingerprint of the unauthenticated cellular telephone determined from the current transmission of the unauthenticated cellular telephone and a stored fingerprint of the corresponding authorized cellular telephone to determine whether there is an adequate match.

If the result of decision 214 is "yes," the call request from the unauthenticated cellular telephone is considered very suspicious and there is a high likelihood that the unauthenticated cellular telephone is a fraudulent telephone. However, rather than simply blocking the call and risking false rejection of a legitimate call as has been done previously, the processor 108 according to the present invention sets a higher threshold for the fingerprint analyzer 116 in step 218. The processor 108 sets the higher threshold to require a closer match between the fingerprint of the unauthenticated cellular telephone derived from the current transmission from the unauthenticated cellular telephone and a stored fingerprint of the corresponding authorized cellular telephone. As discussed above, a fingerprint refers to either a reference waveform transmitted by a cellular telephone or the various transmission characteristics derived from the reference waveform. The fingerprint analysis using the set threshold is performed in step 216.

In one embodiment, the fingerprint analyzer 116 calculates a confidence value in which a higher confidence value indicates a higher degree of match. Thus, the higher threshold required if a destination is on the suspicious list corresponds to a higher confidence value than a predetermined confidence value used for most other calls. In another embodiment, the fingerprint analyzer 116 calculates a variability value in which a higher variability value indicates a lower degree of match. In this embodiment, the higher threshold corresponds to a lower variability value than a predetermined variability value.

At step 220, the processor determines whether there is a match with the stored fingerprint according to either the predetermined threshold (if the result of decision 214 is "no") or the higher threshold set at step 218 (if the result of decision 214 is "yes"). If the result of decision 220 is "yes," the processor 108 allows the call at step 206. In one embodiment, the processor 108 allows the call by doing nothing and letting the cell site controller 24 complete the call. If the result of decision 220 is "no," the processor blocks the call at step 222 and the destination analysis ends at step 224.

A particular destination may be stored in more than one list which are compatible with each other such as the globally invalid list and locally invalid list. In either case, a call request to that destination is blocked. There may be times, however, when a destination may be simultaneously stored in two or more incompatible lists either due to human error or computer error. For example, one destination may be in the globally valid list and globally invalid list at the same time. In such a case, the fraud control system 100 errs on the side of allowing the call rather than risking false rejection of a legitimate call. However, the system 100 flags that destination for later analysis to resolve the inconsistency.

In FIG. 5, if the destination contained in the call request is in any of the lists as determined by the decision blocks 204, 208, 210 and 212, the processor 108 bypasses the fingerprint analysis steps 216 and 220. However, the present invention is not limited to this particular method. Alternatively, the fingerprint analysis may be performed concurrently with the destination analysis steps of FIG. 5. Then, when the destination is in any of the lists as determined by the decision blocks 204, 208, 210 and 212, the processor 108 may either terminate the fingerprint analysis in progress by the fingerprint analyzer 116 or simply ignore the result of the analysis.

Figure 6A:
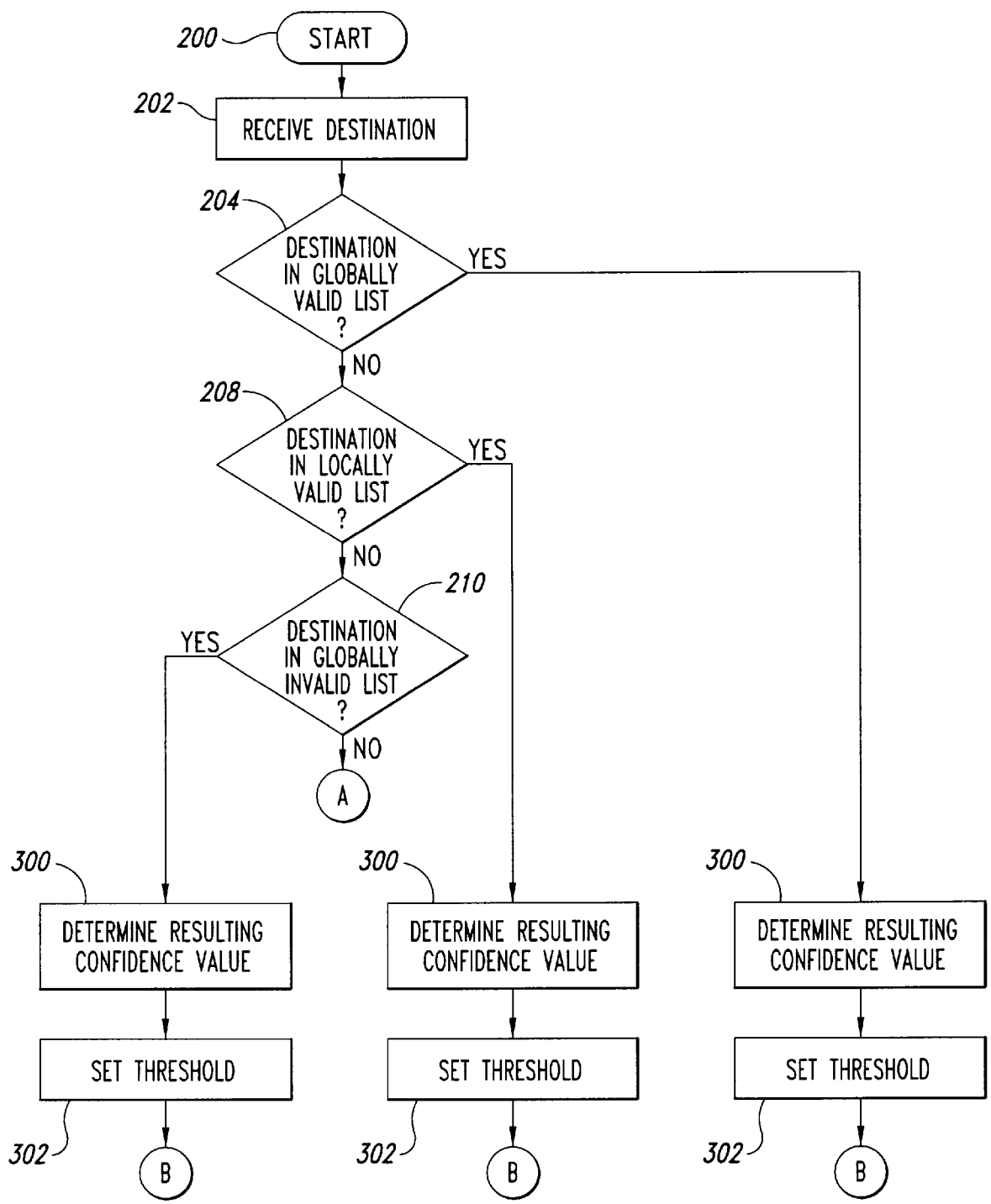
FIGS. 6A and 6B together are a flowchart of an alternative method of preventing fraudulent calls according to the present invention.
Figure 6B:
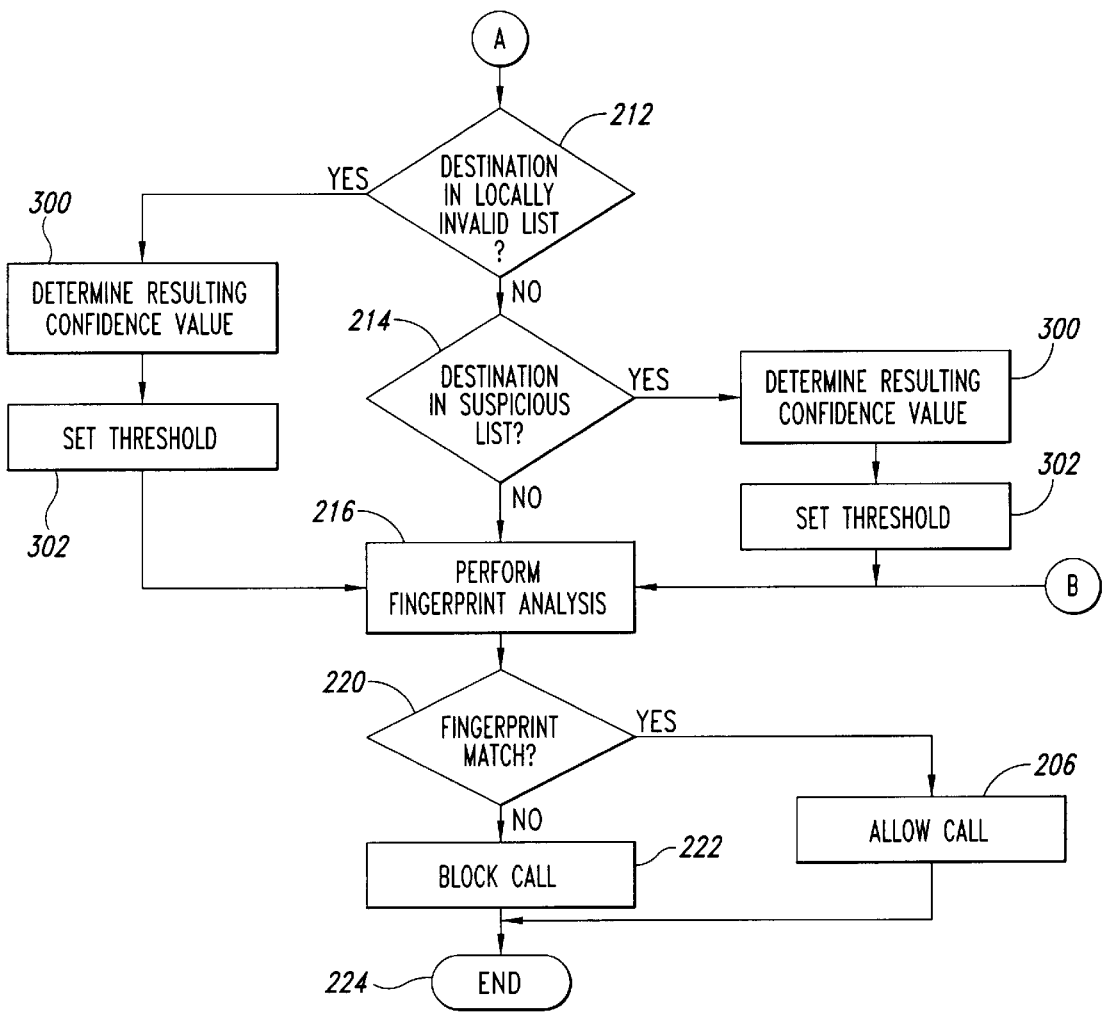

In another alternative embodiment illustrated in FIGS. 6A and 6B, each of the five lists may be assigned or associated with a confidence value. The confidence value can be derived algorithmically from subscriber usage patterns, or empirically from software running in the processor 108. The confidence value may also be set individually by the cellular telephone service provider. These confidence values can then be used to control how much the matching requirements are increased or decreased by the fingerprint analyzer 116. For example, assume that a predetermined system-wide confidence value is 0.5 and a confidence value associated with a particular locally valid list is 0.8. The resulting confidence value (system-wide confidence value * individual confidence value) for any destination contained in that list is 0.4. The destination analysis routine running in the processor 108 can be programmed such that when the resulting confidence value is greater than, for example, 0.3, the fingerprint analyzer 116 performs a fingerprint analysis with a lower threshold than normally used for fingerprint analysis to require a lower or decreased matching. Conversely, when the resulting confidence value is lower than, for example, 0.3, the fingerprint analyzer 116 can be executed with a higher threshold than normally used to require an increased matching.

Each of the five lists may also have multiple confidence values depending on the type of destinations, such as local, long distance and international, which may have confidence values of 1.0, 0.8 and 0.5, respectively. Thus, in the above example where the system-wide confidence value is 0.5, the resulting confidence values for the local, long distance and international destination types are respectively 0.5, 0.4 and 0.25 for a particular list. If that particular list is a locally valid list, then any international destination in that locally valid list requires the higher threshold by the fingerprint analyzer 116 even though all destinations in the locally valid list are considered valid in the previous embodiments. To implement this feature, the destination analysis of FIG. 5 is changed as shown in FIGS. 6A and 6B. After each of the decisions is made in decisions 204, 208, 210, 212 and 214 that the destination is in the corresponding list stored in the storage device 112, i.e., the decision is "yes," the processor 108 next determines the resulting confidence value for the destination in step 300. As noted above, the confidence value can be derived or set in numerous different ways as desired by the service provider. Once the confidence value is determined in step 300, the processor 108 next sets a threshold for the fingerprint analyzer 116 in step 302 corresponding to the determined resulting confidence value. A higher threshold requires a closer match between the fingerprint of the unauthenticated cellular telephone derived from the current transmission from the unauthenticated cellular telephone and a stored fingerprint of the corresponding authorized cellular telephone. Next, the fingerprint analysis using the set threshold is performed in step 216.

Unlike with the embodiment of FIG. 5, instead of allowing or blocking the call based upon simply determining in steps 204, 208, 210 or 212 whether the destination is in one of the globally valid, locally valid, globally invalid or locally invalid lists, in the embodiment of FIGS. 6A and 6B, the processor 108 determines the resulting confidence value and performs a fingerprint analysis with a corresponding lower or higher threshold to require a decreased or increased matching between a fingerprint of the unauthenticated cellular telephone determined from the current transmission of the unauthenticated cellular telephone and a stored fingerprint of the corresponding authorized cellular telephone to determine whether there is an adequate match. It is noted that when a relatively low resulting confidence exists, instead of simply blocking the call, the processor 108 performs a fingerprint analysis with a higher threshold, which may be even higher than the threshold set in step 218 of FIG. 5, to require an increased matching. While illustrated in FIGS. 6A and 6B as determining confidence values and setting thresholds for all five lists, one or more lists may be treated as in FIG. 5 with the mere presence of a destination on the list determining if the call is allowed or blocked.

According to the present invention, a system and method for preventing fraudulent calls in a wireless telephone system has been described. The present invention is designed to be used in a system having a fingerprint analyzer that classifies an unauthenticated wireless telephone as authorized or fraudulent based on a transmission characteristic or fingerprint of an unauthenticated wireless telephone. By providing destination analysis techniques in addition to the fingerprint analysis technique, the present invention provides the advantages of reducing false identification of calls by the fingerprint analyzer and reducing the computational load of the system 100 by not conducting or completing fingerprint analysis for calls that are likely valid.

From the foregoing it will be appreciated that, although specific embodiments of the invention have been described herein for purposes of illustration, various modifications may be made without deviating from the spirit and scope of the invention. For example, the storage device 112 may be located in one central area and accessible to cell sites throughout the country. Alternatively, the system 100 may maintain the destination lists in a central computer and transmit the lists to the storage device 112 at each cell site throughout the country. Accordingly, the present invention is not limited except as by the appended claims.

What is claimed is:

1. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a first threshold for the fingerprint analysis, the method comprising the steps of:

maintaining a plurality of locally valid data, each locally valid data corresponding to a specific authorized wireless telephone and containing at least one destination considered to be valid for the corresponding specific authorized wireless telephone;

maintaining a suspicious data containing at least one destination considered to be called by fraudulent wireless telephones;

receiving from an unauthenticated wireless telephone a call request containing a designated destination and identifying an authorized wireless telephone;

determining whether the designated destination is in the locally valid data corresponding to the identified authorized wireless telephone;

classifying the call as valid when the designated destination is determined to be in the corresponding locally valid data regardless of whether the fingerprint analyzer identifies the unauthenticated wireless telephone as fraudulent;

determining whether the designated destination is in the suspicious data; and when the designated destination is determined to be in the suspicious data, performing a fingerprint analysis by the fingerprint analyzer using a second threshold higher than the first threshold to require an increased matching between the transmission characteristic of the unauthenticated wireless telephone and the stored fingerprint of the identified authorized wireless telephone in order to identify the unauthenticated wireless telephone as authorized.

2. The method according to claim 1, further comprising the steps of:

maintaining a plurality of locally invalid data, each locally invalid data corresponding to a specific authorized wireless telephone and containing at least one destination considered to be invalid for the corresponding specific authorized wireless telephone;

determining whether the designated destination is in the locally invalid data corresponding to the identified authorized wireless telephone; and classifying the call as invalid when the designated destination is determined to be in the corresponding locally invalid data regardless of whether the fingerprint analyzer identifies the unauthenticated wireless telephone as authorized.

3. The method according to claim 2, further comprising the steps of:

maintaining a globally valid data containing at least one destination considered to be valid for a first predetermined group of users;

determining whether the designated destination is in the globally valid data; and classifying the call as valid when the designated destination is determined to be in the globally valid data regardless of whether the fingerprint analyzer identifies the unauthenticated wireless telephone as fraudulent.

4. The method according to claim 3, further comprising the steps of:

maintaining a globally invalid data containing at least one destination considered to be invalid for a second predetermined group of users;

determining whether the designated destination is in the globally invalid data; and classifying the call as invalid when the designated destination is determined to be in the globally invalid data regardless of whether the fingerprint analyzer identifies the unauthenticated wireless telephone as authorized.

5. The method according to claim 4 wherein the globally invalid data includes all destinations within one of a selected office code, area code, and country code.

6. The method according to claim 1, further including when the call is classified as valid, the step of preventing the fingerprint analyzer from performing a fingerprint analysis to identify the unauthenticated wireless telephone as authorized or fraudulent.

7. The method according to claim 1, further including when the call is classified as valid, the step of overriding an identification by the fingerprint analyzer that the unauthenticated wireless telephone is fraudulent.

8. The method according to claim 1, further including when the call is classified as valid, the step of allowing the call.

9. The method according to claim 2, further comprising the step of adding a new destination to the locally invalid data corresponding to the specific authorized wireless telephone based on the payment record for that new destination of a user of the specific authorized wireless telephone.

10. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a first threshold for the fingerprint analysis, the method comprising the steps of:

maintaining a suspicious data containing at least one destination considered to be called by fraudulent wireless telephones;

receiving from an unauthenticated wireless telephone a call request containing a designated destination and identifying an authorized wireless telephone;

determining whether the designated destination is in the suspicious data; and when the designated destination is determined to be in the suspicious data, performing a fingerprint analysis by the fingerprint analyzer using a second threshold higher than the first threshold to require an increased matching between the transmission characteristic of the unauthenticated wireless telephone and the stored fingerprint of the identified authorized wireless telephone in order to identify the unauthenticated wireless telephone as authorized.

11. The method according to claim 10, further comprising the steps of:

maintaining a globally valid data containing at least one destination considered to be valid for a predetermined group of users;

determining whether the designated destination is in the globally valid data; and classifying the call as valid when the designated destination is determined to be in the globally valid data regardless of whether the fingerprint analyzer identifies the unauthenticated wireless telephone as fraudulent.

12. The method according to claim 11 wherein the predetermined group of users includes all users.

13. The method according to claim 10, further comprising the steps of:

maintaining a globally invalid data containing at least one destination considered to be invalid for a predetermined group of users;

determining whether the designated destination is in the globally invalid data; and classifying the call as invalid when the designated destination is determined to be in the globally invalid data regardless of whether the fingerprint analyzer identifies the unauthenticated wireless telephone as authorized.

14. The method according to claim 10, further comprising the steps of:

maintaining a plurality of locally invalid data, each locally invalid data corresponding to a specific authorized wireless telephone and containing at least one destination considered to be invalid for the corresponding specific authorized wireless telephone;

determining whether the designated destination is in the locally invalid data corresponding to the identified authorized wireless telephone; and classifying the call as invalid when the designated destination is determined to be in the corresponding locally invalid data regardless of whether the fingerprint analyzer identifies the unauthenticated wireless telephone as authorized.

15. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone, the method comprising the steps of:

maintaining a plurality of locally valid data, each locally valid data corresponding to a specific authorized wireless telephone and containing at least one destination considered to be valid for the corresponding specific authorized wireless telephone;

maintaining a plurality of locally invalid data, each locally invalid data corresponding to a specific authorized wireless telephone and containing at least one destination considered to be invalid for the corresponding specific authorized wireless telephone;

receiving from an unauthenticated wireless telephone a call request containing a designated destination and identifying an authorized wireless telephone;

determining whether the designated destination is in the locally valid data corresponding to the identified authorized wireless telephone;

classifying the call as valid when the designated destination is determined to be in the corresponding locally valid data regardless of whether the fingerprint analyzer identifies the unauthenticated wireless telephone as fraudulent;

determining whether the designated destination is in the locally invalid data corresponding to the identified authorized wireless telephone; and classifying the call as invalid when the designated destination is determined to be in the corresponding locally invalid data regardless of whether the fingerprint analyzer identifies the unauthenticated wireless telephone as authorized.

16. The method according to claim 15, further including when the call is classified as valid, the step of preventing the fingerprint analyzer from performing a fingerprint analysis to identify the unauthenticated wireless telephone as authorized or fraudulent.

17. The method according to claim 15, further comprising the steps of:

maintaining a globally invalid data containing at least one destination considered to be invalid for a predetermined group of users;

determining whether the designated destination is in the globally invalid data; and classifying the call as invalid when the designated destination is determined to be in the globally invalid data regardless of whether the fingerprint analyzer identifies the unauthenticated wireless telephone as authorized.

18. The method according to claim 15 wherein the fingerprint analyzer utilizes a first threshold for the fingerprint analysis, further comprising the steps of:

maintaining a suspicious data containing at least one destination considered to be called by fraudulent wireless telephones;

determining whether the designated destination is in the suspicious data; and when the designated destination is determined to be in the suspicious data, performing a fingerprint analysis by the fingerprint analyzer using a second threshold higher than the first threshold to require an increased matching between the transmission characteristic of the unauthenticated wireless telephone and the stored fingerprint of the identified authorized wireless telephone in order to identify the unauthenticated wireless telephone as authorized.

19. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone, the method comprising the steps of:

maintaining a plurality of locally valid data, each locally valid data corresponding to a specific authorized wireless telephone and containing at least one destination considered to be valid for the corresponding specific authorized wireless telephone;

receiving from an unauthenticated wireless telephone a call request containing a designated destination and identifying an authorized wireless telephone;

determining whether the designated destination is in the locally valid data corresponding to the identified authorized wireless telephone; and classifying the call as valid when the designated destination is determined to be in the corresponding locally valid data regardless of whether the fingerprint analyzer identifies the unauthenticated wireless telephone as fraudulent.

20. The method according to claim 19, further comprising the step of when the call is classified as valid, preventing the fingerprint analyzer from performing a fingerprint analysis of the unauthenticated wireless telephone.

21. The method according to claim 19, further comprising the steps of:

maintaining a globally valid data containing at least one destination considered to be valid for a predetermined group of users;

determining whether the designated destination is in the globally valid data; and classifying the call as valid when the designated destination is determined to be in the globally valid data regardless of whether the fingerprint analyzer identifies the unauthenticated wireless telephone as fraudulent.

22. The method according to claim 21 wherein the predetermined group of users includes all users.

23. The method according to claim 19, further comprising the steps of:

maintaining a globally invalid data containing at least one destination considered to be invalid for a predetermined group of users;

determining whether the designated destination is in the globally invalid data; and classifying the call as invalid when the designated destination is determined to be in the globally invalid data regardless of whether the fingerprint analyzer identifies the unauthenticated wireless telephone as authorized.

24. The method according to claim 23 wherein the predetermined group of users includes all users.

25. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a selected threshold for the fingerprint analysis, the method comprising the steps of:

maintaining a plurality of locally valid data, each locally valid data corresponding to a specific authorized wireless telephone and containing at least one destination considered to be valid for the corresponding specific authorized wireless telephone;

maintaining a suspicious data containing at least one destination considered to be called by fraudulent wireless telephones;

receiving from an unauthenticated wireless telephone a call request containing a designated destination and identifying an authorized wireless telephone;

determining whether the designated destination is in the locally valid data corresponding to the identified authorized wireless telephone;

setting a first threshold different from the selected threshold if the designated destination is determined to be in the corresponding locally valid data;

determining whether the designated destination is in the suspicious data;

setting a second threshold different from the selected threshold if the designated destination is determined to be in the suspicious data; and performing a fingerprint analysis by the fingerprint analyzer using the first threshold if the designated destination is determined to be in the corresponding locally valid data and using the second threshold if the designated destination is determined to be in the suspicious data, with the first and second thresholds each being selected to require a corresponding selected matching between the transmission characteristic of the unauthenticated wireless telephone and the stored fingerprint of the identified authorized wireless telephone in order to identify the unauthenticated wireless telephone as authorized.

26. The method according to claim 25, further comprising the steps of determining a first confidence value if the designated destination is determined to be in the corresponding locally valid data and determining a second confidence value if the designated destination is determined to be in the suspicious data, and wherein the first and second thresholds are set based upon the determined value of the first and second confidence values, respectively.

27. The method according to claim 25, further comprising the steps of:

maintaining a plurality of locally invalid data, each locally invalid data corresponding to a specific authorized wireless telephone and containing at least one destination considered to be invalid for the corresponding specific authorized wireless telephone;

determining whether the designated destination is in the locally invalid data corresponding to the identified authorized wireless telephone;

setting a third threshold different from the selected threshold if the designated destination is determined to be in the corresponding locally invalid data; and performing a fingerprint analysis by the fingerprint analyzer using the third threshold if the designated destination is determined to be in the corresponding locally invalid data, with the third threshold being selected to require a corresponding selected matching between the transmission characteristics of the unauthenticated wireless telephone and the stored fingerprint of the identified authorized wireless telephone in order to identify the unauthenticated wireless telephone as authorized.

28. The method according to claim 27, further comprising the steps of determining a first confidence value if the designated destination is determined to be in the corresponding locally valid data, determining a second confidence value if the designated destination is determined to be in the suspicious data, and determining a third confidence value if the designated destination is determined to be in the corresponding locally invalid data, and wherein the first, second and third thresholds are set based upon the determined value of the first, second and third confidence values, respectively.

29. The method according to claim 27, further comprising the steps of:

maintaining a globally valid data containing at least one destination considered to be valid for a first predetermined group of users;

determining whether the designated destination is in the globally valid data;

setting a fourth threshold different from the selected threshold if the designated destination is determined to be in the globally valid data; and performing a fingerprint analysis by the fingerprint analyzer using the fourth threshold if the designated destination is determined to be in the globally valid data, with the fourth threshold being selected to require a corresponding selected matching between the transmission characteristic of the unauthenticated wireless telephone and the stored fingerprint of the identified authorized wireless telephone in order to identify the unauthenticated wireless telephone as authorized.

30. The method according to claim 29, further comprising the steps of determining a first confidence value if the designated destination is determined to be in the corresponding locally valid data, determining a second confidence value if the designated destination is determined to be in the suspicious data, determining a third confidence value if the designated destination is determined to be in the corresponding locally invalid data, and determining a fourth confidence value if the designated destination is determined to be in the globally valid data, and wherein the first, second, third and fourth thresholds are set based upon the determined value of the first, second, third and fourth confidence values, respectively.

31. The method according to claim 29, further comprising the steps of:

maintaining a globally invalid data containing at least one destination considered to be invalid for a second predetermined group of users;

determining whether the designated destination is in the globally invalid data;

setting a fifth threshold different from the selected threshold if the designated destination is determined to be in the globally invalid data; and performing a fingerprint analysis by the fingerprint analyzer using the fifth threshold if the designated destination is determined to be in the globally invalid data, with the fifth threshold being selected to require a corresponding selected matching between the transmission characteristic of the unauthorized wireless telephone and the stored fingerprint of the identified authorized wireless telephone in order to identify the unauthenticated wireless telephone as authorized.

32. The method according to claim 30, further comprising the steps of determining a first confidence value if the designated destination is determined to be in the corresponding locally valid data, determining a second confidence value if the designated destination is determined to be in the suspicious data, determining a third confidence value if the designated destination is determined to be in the corresponding locally invalid data, determining a fourth confidence value if the designated destination is determined to be in the globally valid data, and determining a fifth confidence value if the designated destination is determined to be in the globally invalid data, and wherein the first, second, third, fourth and fifth thresholds are set based upon the determined value of the first, second, third, fourth and fifth confidence values, respectively.

33. The method according to claim 31 wherein the globally invalid data includes all destinations within one of a selected office code, area code, and country code.

34. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a selected threshold for the fingerprint analysis, the method comprising the steps of:

maintaining a suspicious data containing at least one destination considered to be called by fraudulent wireless telephones;

receiving from an unauthenticated wireless telephone a call request containing a designated destination and identifying an authorized wireless telephone;

determining whether the designated destination is in the suspicious data;

setting a first threshold different from the selected threshold if the designated destination is determined to be in the suspicious data; and performing a fingerprint analysis by the fingerprint analyzer using the first threshold if the designated destination is determined to be in the suspicious data, with the first threshold being selected to require a corresponding selected matching between the transmission characteristic of the unauthenticated wireless telephone and the stored fingerprint of the identified authorized wireless telephone in order to identify the unauthenticated wireless telephone as authorized.

35. The method of claim 34, further comprising the steps of determining a confidence value if the designated destination is determined to be in the suspicious data, and wherein the first threshold is set based upon the determined value of the confidence value.

36. The method according to claim 34, further comprising the steps of:

maintaining a globally valid data containing at least one destination considered to be valid for a predetermined group of users;

determining whether the designated destination is in the globally valid data;

setting a second threshold different from the selected threshold if the designated destination is determined to be in the globally valid data; and performing a fingerprint analysis by the fingerprint analyzer using the second threshold if the designated destination is determined to be in the globally valid data, with the second threshold being selected to require a corresponding selected matching between the transmission characteristic of the unauthenticated wireless telephone and the stored fingerprint of the identified authorized wireless telephone in order to identify the unauthenticated wireless telephone as authorized.

37. The method of claim 36, further comprising the steps of determining a confidence value if the designated destination is determined to be in the globally valid data, and wherein the second threshold is set based upon the determined value of the confidence value.

38. The method according to claim 36 wherein the predetermined group of users includes all users.

39. The method of claim 36 wherein the second threshold is less than the selected threshold.

40. The method according to claim 34, further comprising the steps of:

maintaining a globally invalid data containing at least one destination considered to be invalid for a predetermined group of users;

determining whether the designated destination is in the globally invalid data;

setting a second threshold different from the selected threshold if the designated destination is determined to be in the globally invalid data; and performing a fingerprint analysis by the fingerprint analyzer using the second threshold if the designated destination is determined to be in the globally invalid data, with the second threshold being selected to require a corresponding selected matching between the transmission characteristic of the unauthenticated wireless telephone and the stored fingerprint of the identified authorized wireless telephone in order to identify the unauthenticated wireless telephone as authorized.

41. The method of claim 40, further comprising the steps of determining a confidence value if the designated destination is determined to be in the globally invalid data, and wherein the second threshold is set based upon the determined value of the confidence value.

42. The method according to claim 34, further comprising the steps of:

maintaining a plurality of locally invalid data, each locally invalid data corresponding to a specific authorized wireless telephone and containing at least one destination considered to be invalid for the corresponding specific authorized wireless telephone;

determining whether the designated destination is in the locally invalid data corresponding to the identified authorized wireless telephone;

setting a second threshold different from the selected threshold if the designated destination is determined to be in the corresponding locally invalid data; and performing a fingerprint analysis by the fingerprint analyzer using the second threshold if the designated destination is determined to be in the corresponding locally valid data, with the second threshold being selected to require a corresponding selected matching between the transmission characteristic of the unauthenticated wireless telephone and the stored fingerprint of the identified authorized wireless telephone in order to identify the unauthenticated wireless telephone as authorized.

43. The method of claim 42, further comprising the steps of determining a confidence value if the designated destination is determined to be in the corresponding locally invalid data, and wherein the second threshold is set based upon the determined value of the confidence value.

44. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a selected threshold for the fingerprint analysis, the method comprising the steps of:

maintaining a plurality of locally valid data, each locally valid data corresponding to a specific authorized wireless telephone and containing at least one destination considered to be valid for the corresponding specific authorized wireless telephone;

maintaining a plurality of locally invalid data, each locally invalid data corresponding to a specific authorized wireless telephone and containing at least one destination considered to be invalid for the corresponding specific authorized wireless telephone;

receiving from an unauthenticated wireless telephone a call request containing a designated destination and identifying an authorized wireless telephone;

determining whether the designated destination is in the locally valid data corresponding to the identified authorized wireless telephone;

setting a first threshold different from the selected threshold if the designated destination is determined to be in the corresponding locally valid data;

determining whether the designated destination is in the locally invalid data corresponding to the identified authorized wireless telephone;

setting a second threshold different from the selected threshold if the designated destination is determined to be in the corresponding locally invalid data; and performing a fingerprint analysis by the fingerprint analyzer using the first threshold if the designated destination is determined to be in the corresponding locally valid data and using the second threshold if the designated destination is determined to be in the corresponding locally invalid data, with the first and second thresholds each being selected to require a corresponding selected matching between the transmission characteristic of the unauthenticated wireless telephone and the stored fingerprint of the identified authorized wireless telephone in order to identify the unauthenticated wireless telephone as authorized.

45. The method according to claim 44, further comprising the steps of determining a first confidence value if the designated destination is determined to be in the corresponding locally valid data and determining a second confidence value if the designated destination is determined to be in the corresponding locally invalid data, and wherein the first and second thresholds are set based upon the determined value of the first and second confidence values, respectively.

46. The method according to claim 44, further comprising the steps of:

maintaining a globally invalid data containing at least one destination considered to be invalid for a predetermined group of users;

determining whether the designated destination is in the globally invalid data;

setting a third threshold different from the selected threshold if the designated destination is determined to be in the globally invalid data; and performing a fingerprint analysis by the fingerprint analyzer using the third threshold if the designated destination is determined to be in the globally invalid data, with the third threshold being selected to require a corresponding selected matching between the transmission characteristic of the unauthenticated wireless telephone and the stored fingerprint of the identified authorized wireless telephone in order to identify the unauthenticated wireless telephone as authorized.

47. The method according to claim 46, further comprising the steps of determining a first confidence value if the designated destination is determined to be in the corresponding locally valid data, determining a second confidence value if the designated destination is determined to be in the corresponding locally invalid data, and determining a third confidence value if the designated destination is determined to be in the globally invalid data, and wherein the first, second and third thresholds are set based upon the determined value of the first, second and third confidence values, respectively.

48. The method according to claim 44, further comprising the steps of:

maintaining a suspicious data containing at least one destination considered to be called by fraudulent wireless telephones;

determining whether the designated destination is in the suspicious data;

setting a third threshold different from the selected threshold if the designated destination is determined to be in the suspicious data; and performing a fingerprint analysis by the fingerprint analyzer using the third threshold if the designated destination is determined to be in the suspicious data, with the third threshold being selected to require a corresponding selected matching between the transmission characteristic of the unauthenticated wireless telephone and the stored fingerprint of the identified authorized wireless telephone in order to identify the unauthenticated wireless telephone as authorized.

49. The method according to claim 48, further comprising the steps of determining a first confidence value if the designated destination is determined to be in the corresponding locally valid data, determining a second confidence value if the designated destination is determined to be in the corresponding locally invalid data, and determining a third confidence value if the designated destination is determined to be in the suspicious data, and wherein the first, second and third thresholds are set based upon the determined value of the first, second and third confidence values, respectively.

50. A method of preventing fraudulent calls by users of a wireless telephone system including a fingerprint analyzer that identifies an unauthenticated wireless telephone as authorized or fraudulent based on a fingerprint analysis of comparing a transmission characteristic of the unauthenticated wireless telephone with a stored fingerprint of a corresponding authorized wireless telephone using a selected threshold for the fingerprint analysis, the method comprising the steps of:

maintaining a plurality of locally valid data, each locally valid data corresponding to a specific authorized wireless telephone and containing at least one destination considered to be valid for the corresponding specific authorized wireless telephone;

receiving from an unauthenticated wireless telephone a call request containing a designated destination and identifying an authorized wireless telephone;

determining whether the designated destination is in the locally valid data corresponding to the identified authorized wireless telephone;

setting a first threshold different from the selected threshold if the designated destination is determined to be in the corresponding locally valid data; and performing a fingerprint analysis by the fingerprint analyzer using the first threshold if the designated destination is determined to be in the corresponding locally valid data, with the first threshold being selected to require a corresponding selected matching between the transmission characteristic of the unauthenticated wireless telephone and the stored fingerprint of the identified authorized wireless telephone in order to identify the unauthenticated wireless telephone as authorized.

51. The method of claim 50, further comprising the steps of determining a confidence value if the designated destination is determined to be in the corresponding locally valid data, and wherein the first threshold is set based upon the determined value of the confidence value.

52. The method according to claim 50, further comprising the steps of:

maintaining a globally valid data containing at least one destination considered to be valid for a predetermined group of users;

determining whether the designated destination is in the globally valid data;

setting a second threshold different from the selected threshold if the designated destination is determined to be in the globally valid data; and performing a fingerprint analysis by the fingerprint analyzer using the second threshold if the designated destination is determined to be in the globally valid data, with the second threshold being selected to require a corresponding selected matching between the transmission characteristic of the unauthenticated wireless telephone and the stored fingerprint of the identified authorized wireless telephone in order to identify the unauthenticated wireless telephone as authorized.

53. The method of claim 52, further comprising the steps of determining a confidence value if the designated destination is determined to be in the globally valid data, and wherein the second threshold is set based upon the determined value of the confidence value.

54. The method according to claim 50, further comprising the steps of:

maintaining a globally invalid data containing at least one destination considered to be invalid for a predetermined group of users;

determining whether the designated destination is in the globally invalid data;

setting a second threshold different from the selected threshold if the designated destination is determined to be in the globally invalid data; and performing a fingerprint analysis by the fingerprint analyzer using the second threshold if the designated destination is determined to be in the globally invalid data, with the second threshold being selected to require a corresponding selected matching between transmission characteristic of the unauthenticated wireless telephone and the stored fingerprint of the identified authorized wireless telephone in order to identify the unauthenticated wireless telephone as authorized.

55. The method of claim 54, further comprising the steps of determining a confidence value if the designated destination is determined to be in the globally invalid data, and wherein the second threshold is set based upon the determined value of the confidence value.

56. A system for preventing fraudulent calls by users of a wireless telephone network comprising:

a storage device operable to store a designated destination contained in a call request from an unauthenticated wireless telephone, the storage device operable to store a plurality of locally valid data, each locally valid data corresponding to a specific authorized wireless telephone and containing at least one destination considered to be valid for the corresponding specific authorized wireless telephone;

a fingerprint analyzer that identifies the unauthenticated wireless telephone as authorized or fraudulent based on a fingerprint analysis of comparing a transmission characteristic of the unauthenticated wireless telephone with a stored fingerprint of a corresponding authorized wireless telephone; and a processor connected to the fingerprint analyzer and the storage device, and operable to determine whether the designated destination is in the locally valid data for the corresponding authorized wireless telephone and to classify the call as valid when the designated destination is determined to be in the corresponding locally valid data regardless of whether the fingerprint analyzer identifies the unauthenticated wireless telephone as fraudulent.

57. The system according to claim 56 wherein when the designated destination is determined to be in the corresponding locally valid data, the processor prevents the fingerprint analyzer from performing a fingerprint analysis to identify the unauthenticated wireless telephone as authorized or fraudulent.

58. The system according to claim 56 wherein:

the fingerprint analyzer utilizes a first threshold for the fingerprint analysis;

the storage device stores a suspicious data containing at least one destination considered to be called by fraudulent wireless telephones; and the processor determines whether the designated destination is in the suspicious data and when the designated destination is determined to be in the suspicious data, the processor executes through the fingerprint analyzer a fingerprint analysis using a second threshold higher than the first threshold to require an increased matching between the transmission characteristic of the unauthenticated wireless telephone and the stored fingerprint of the corresponding authorized wireless telephone.

59. The system according to claim 56 wherein:

the storage device stores a globally valid data containing at least one destination considered to be valid for all users; and the processor determines whether the designated destination is in the globally valid data and classifies the call as valid when the designated destination is determined to be in the globally valid data regardless of whether the fingerprint analyzer identifies the unauthenticated wireless telephone as fraudulent.

60. The system according to claim 56 wherein:

the storage device stores a globally invalid data containing at least one destination considered to be invalid for all users; and the processor determines whether the designated destination is in the globally invalid data and classifies the call as invalid when the designated destination is determined to be in the globally invalid data regardless of whether the fingerprint analyzer identifies the unauthenticated wireless telephone as authorized.

61. The system according to claim 56 wherein:

the storage device stores a plurality of locally invalid data, each locally invalid data corresponding to a specific authorized wireless telephone and containing at least one destination considered to be invalid for the corresponding specific authorized wireless telephone; and the processor determines whether the designated destination is in the locally invalid data corresponding to the unauthenticated wireless telephone and classifies the call as invalid when the designated destination is determined to be in the corresponding locally invalid data for the corresponding authorized wireless telephone regardless of whether the fingerprint analyzer identifies the unauthenticated wireless telephone as authorized.

62. A system for preventing fraudulent calls by users of a wireless telephone network, comprising:

a storage device operable to store a designated destination contained in a call request from an unauthenticated wireless telephone, the storage device operable to store a suspicious data containing at least one destination considered to be called by fraudulent wireless telephones;

a fingerprint analyzer that identifies the unauthenticated wireless telephone as authorized or fraudulent based on a fingerprint analysis of comparing a transmission characteristic of the unauthenticated wireless telephone with a stored fingerprint of a corresponding authorized wireless telephone using a first threshold and a second threshold higher than the first threshold to require an increased matching between the transmission characteristic of the unauthenticated wireless telephone and the stored fingerprint of the corresponding authorized wireless telephone; and a processor connected to the fingerprint analyzer and the storage device, and operable to determine whether the designated destination is in the suspicious data and to execute through the fingerprint analyzer a fingerprint analysis using the second threshold when the designated destination is determined to be in the suspicious data.

63. A system for preventing fraudulent calls in a wireless telephone system comprising:

a storage device operable to store a designated destination contained in a call request from an unauthenticated wireless telephone, the storage device operable to store a suspicious data containing at least one destination considered to be called by fraudulent wireless telephones and to store a plurality of locally invalid data, each locally invalid data corresponding to a specific authorized wireless telephone and containing at least one destination considered to be invalid for the corresponding specific authorized wireless telephone;

a fingerprint analyzer that identifies the unauthenticated wireless telephone as authorized or fraudulent based on a fingerprint analysis of comparing a transmission characteristic of the unauthenticated wireless telephone with a stored fingerprint of a corresponding authorized wireless telephone using a first threshold and a second threshold higher than the first threshold to require an increased matching between the transmission characteristic of the unauthenticated wireless telephone and the stored fingerprint of the corresponding authorized wireless telephone; and a processor connected to the fingerprint analyzer and the storage device, and operable to determine whether the designated destination is in the suspicious data or the locally invalid data for the corresponding authorized wireless telephone and to execute through the fingerprint analyzer a fingerprint analysis using the second threshold when the designated destination is determined to be in the suspicious data, the processor operable to classify the call as invalid when the designated destination is determined to be in the locally invalid data for the corresponding authorized wireless telephone regardless of whether the fingerprint analyzer identifies the unauthenticated wireless telephone as authorized.

* * * * *